Dec. 8, 1942.
W. H. OSBORN
2,304,197
TIN RECOVERY PROCESS
Filed Feb. 7, 1941
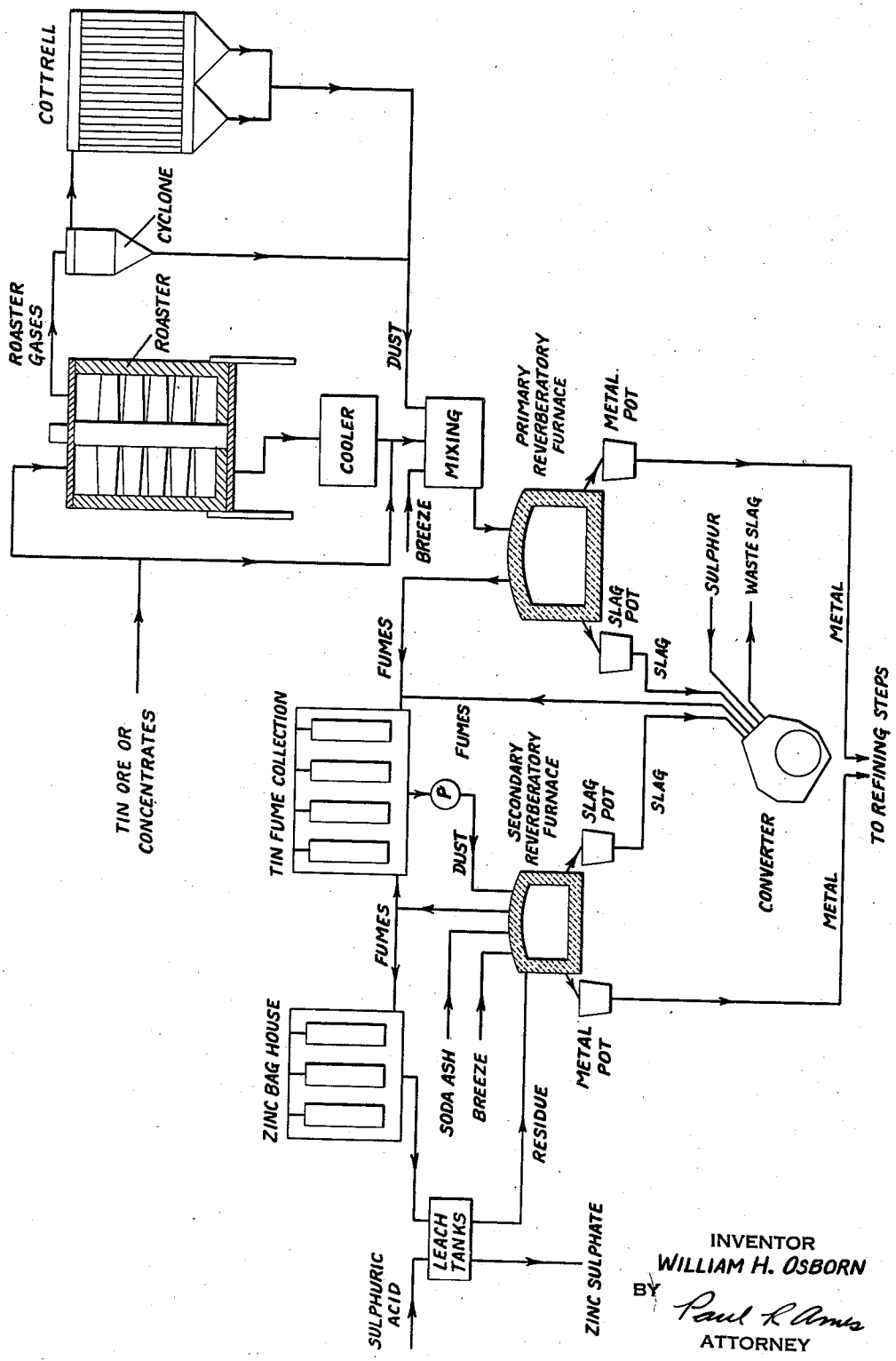
INVENTOR
WILLIAM H. OSBORN
BY
Paul R Ames
ATTORNEY Patented Dec. 8, 1942

2,304,197

UNITED STATES PATENT OFFICE 2,304,197

TIN RECOVERY PROCESS

William H. Osborn, New York, N. Y., assignor to Phelps Dodge Corporation, New York, N. Y., a corporation of New York Application February 7, 1941, Serial No. 377,823

19 Claims. (Cl. 75—85)

This invention relates to the recovery of tin and more particularly to improvements in the procedures for the separation of tin from other metals commonly associated with it. In the description particular reference will be made to the recovery of tin from cassiterite ore or concentrates from Bolivia. However, the process as a whole and the various novel steps of the process are also applicable to the recovery or separation of tin from other ores or tin concentrates or from other sources and particularly sources in which tin is associated with a relatively large amount of iron and silicates.

Most ores and concentrates of tin, such as the concentrates produced in Bolivia, consist principally of the mineral cassiterite (a tin oxide having the formula $SnO_2$), oxides of iron such as hematite or combined iron silicates, and silica such as the mineral quartz or combined silicates. In addition to these principal constituents, there are generally the minerals of other metals such as arsenic, antimony, lead, bismuth, silver, etc., present in relatively minor proportions. When such concentrates are melted down by application of temperature and in the presence of just sufficient reducing agents, for example, solid carbonaceous matter such as coal or coke, or gaseous reducing agents such as carbon monoxide or hydrogen, the tin is first reduced to stannous oxide and combines with the silica to form a fluid stannous silicate of the generalized formula $(SnO)_x(SiO_2)_y$, and the ferric oxides are reduced to ferrous oxide to form ferrous silicates of the generalized formula $(FeO)_x(SiO_2)_y$. If reduction is carried further than the point at which these tin and iron silicates are formed, they will be reduced to metallic tin which will remain in equilibrium with the stannous silicates of the slag, and if carried far enough iron compounds will be reduced to metallic iron which will remain in equilibrium with the ferrous silicates of the slag. These equilibriums are such that when the ratio of iron to tin in the original ore or concentrates is relatively high, and it is desired to reduce the amount of tin in the slags to a point where the slag may be discarded without excessive loss of tin, it is necessary to reduce to metal, along with the tin, a certain proportion of the iron. The proportion of iron reduced with tin increases rapidly as the ratio of iron to tin in the original ore or concentrates increases.

If lime is added to the ore or concentrate to be smelted, it has the effect of increasing the ratio between metallic tin and tin combined as a silicate so that lower commercial slags can be produced by the addition of lime, but the proportion of iron reduced with the tin to metal remains roughly the same.

Thus, in order to produce tin free or relatively free from iron in the reduction of low grade tin concentrates, it is necessary to limit the reduction to a point where excessive amounts of tin will remain in the slag.

In order to meet this problem, previous commercial practice in the smelting of tin ores has been to first reduce the ore by smelting with carbonaceous matter only to a point where metallic tin relatively free of iron is separated from the molten bath, leaving a slag which contains too much tin to allow its rejection. This slag is then generally separated from the reduced tin metal by skimming and further reduced with additional carbonaceous matter to a point where a commercial grade of slag has been produced through the reduction of iron as well as tin to metal. The iron-tin-alloy known as "hardhead" thus produced is then generally re-smelted with fresh cassiterite concentrates and through the chemical reaction:

$$SnO_2 + 2Fe \rightarrow Sn + 2FeO$$

the iron in the metal is oxidized by the tin oxide in the fresh charge and returned to slag.

This method of smelting tin concentrates becomes practical when the grade of concentrates is relatively high—say, 50% tin or better—but even at best, requires an expensive rehandling and recycling of slag and hardhead materials.

When the grade of concentrates is low—say, from 45 or 50% tin down to 10% tin—this method or reducing tin becomes increasingly impractical as the proportion of the total tin which can be reduced from the slag without reduction of iron with it becomes less and less.

In order to avoid this difficulty, various schemes have been proposed whereby the tin is separated from the iron by making use of the fact that stannous sulfide is volatile at elevated temperatures at which iron sulfide is not volatile. Tin oxide such as cassiterite $SnO_2$ may be turned to stannous sulfide by contact with sulfur in sufficient quantities to carry out the reaction:

$$SnO_2 + 2S \rightarrow SnS + SO_2$$

or by reaction with carbon and sulfur according to the simplified equation:

$$SnO_2 + C + S \rightarrow SnS + CO_2$$

Previous methods of carrying out this sulfidation have contemplated and practiced the sulfidation of the original concentrate by a variety of methods such as the passage of a mixture of concentrates, carbonaceous matter and sulfur-bearing matter through a heated rotary kiln, and elimination of volatile sulfides, or by briquetting tin oxide concentrates with coal and sulfur or pyrite, and heating over a coke fired grate, or passing through a shaft furnace, etc.

In general, it may be said that the most economical way of reducing tin is by simply smelting the ore with carbonaceous matter either in a reverberatory or shaft type of furnace, but that—as shown above—when the grade of concentrates is too low this simple reduction becomes uneconomical. Also that the sulfidation to a volatile stannous sulfide, the oxidation of stannous sulfide to stannic oxide fume, the collection of the fume, and the reduction of this fume to metal, is more expensive per unit of tin than the straight reduction with carbon of tin oxide concentrate to tin metal.

General commercial practice has therefore been to attempt normal smelting of tin with carbonaceous material when the grade of concentrates made it possible, and when the grade of concentrates was too low to do this economically the concentrates have been put through one or another of the methods of sulfidation and volatilization of tin. In previous practice, it has only been attempted to sulfidize the tin from the original ore or from other solid tin bearing material and not to sulfidize tin from liquid silicate slags resulting from preliminary carbonaceous reduction of concentrates.

It is an object of the present invention to provide an improved procedure for the recovery of tin, and its separation from other metals or impurities. Another object is to provide an improved procedure by which tin may be economically separated from relatively low grade ores or concentrates containing relatively large amounts of iron and silicates. A further object is to provide an improved procedure for the fuming of tin in the form of sulfides. Other objects will become apparent.

It has now been found that it is possible to separate tin from liquid silicate slag containing combined tin silicates by blowing through such a bath of liquid slag a combination of air, fuel oil (or other carbonaceous matter) and iron pyrites or other sulfur-bearing material. The tin combined as a silicate is partly reduced to metal by the reducing action of the flame under the bath and at the same time sulfidized to volatile sulfide by the pyrite introduced with the air and fuel. An apparatus suitable for carrying out this reduction and sulfidization is described in copending patent application Serial No. 349,467, filed August 2, 1940, now Patent 2,261,559, issued November 4, 1941. Because of this practical method of separating tin from molten slag by volatilization, it is preferred in the smelting of tin to combine the merits of direct reduction with carbonaceous matter with the method of separation by volatilization of that proportion of the original tin which is difficult or commercially impractical to separate by direct reduction. The process contemplates, therefore, first reducing, preferably in a reverberatory furnace but as an alternate in a shaft type of furnace or other suitable reducing furnace, tin bearing concentrates to metallic tin and a molten slag containing whatever proportion of tin is necessary to avoid the reduction of metallic iron with the metallic tin. This fluid, but high-tin slag, is then subjected to a stream of reducing gases and sulfur-bearing material introduced by blowing a combination of air, fuel and pyrites or other sulfur-bearing materials under the surface of the liquid bath, as described in more detail hereinafter, in order to separate by volatilization that proportion of the original tin which cannot be separated from iron because of the carbonaceous reduction of iron metal along with tin metal. The tin oxide fumes formed above the bath, by volatilization of this tin content as stannous sulfide and conversion to tin oxide over the bath, are caught in a bag house or other conventional means, and are then mixed with coal and smelted down to tin metal, either in the same furnace as that in which the original carbonaceous reduction is carried out, or in a separate furnace.

By this means complete flexibility of tin smelting practice is achieved so that the same furnace units can treat economically tin concentrates ranging from 9% tin all the way to high grade concentrates running, say, 60% tin or better. If the grade of concentrates is so low that it is not practical to attempt direct reduction to metal in the first smelting, only sufficient reducing agent is added to reduce the stannic and ferric oxides to stannous and ferrous silicates and the whole melt is then subjected to the sulfidizing and volatilizing blow. In practice, tin concentrates running from 9 up to 18 or 20% tin are treated in this manner. With concentrates running perhaps 25% tin or better, it pays to add sufficient carbonaceous matter in the original smelting to form iron free tin metal covered by a layer of high-tin slag which may run from 10 to 15% tin, skim off this slag from the metal, and subject it to the sulfidizing and volatilizing blow. As the amount of tin in the concentrates increases, a larger proportion of the total tin is brought down in the first reduction.

Most Bolivian concentrates contain some iron pyrites along with the tin, and iron oxides. Where the grade of these concentrates is so low that it scarcely pays to attempt reduction to metal in the first smelting operation, it is preferred to leave these sulfides in the charge to the first smelting furnace where they have the effect of sulfidizing some of the tin in the first smelting operation. For example, a 20% tin concentrate containing approximately 3% sulfur present as iron pyrite, may be smelted in a reverberatory furnace with approximately 8% anthracite coal. The sulfur present in this charge will cause approximately three times its own weight of tin to be volatilized in this first furnace so that the product of the furnace will be a tin-iron-silicate slag running approximately 14% tin and a tin fume containing approximately one-half the tin in the original charge. If the grade of concentrates is, say, over 25% tin and still contains some sulfur, it is preferred to first roast these concentrates for elimination of the sulfur in order to prevent volatilization of tin in the first smelting operation, and bring down as much tin as possible as metal in this operation. The exact determination of the point where it pays to roast the concentrates and make tin metal in the first smelting operation depends on the combination of economic factors involved.

In giving a specific example of the invention, reference will be made to the treatment of a Bolivian cassiterite containing about 20% tin, mostly as stannic oxide ($SnO_2$) together with small amounts of lead, arsenic, antimony, bismuth, silver, zinc, copper, iron, gold, etc., in the form of oxides, sulfides or silicates.

Primary reverberatory

The pulverized ore may be mixed with powdered coal (Anthracite Breeze) in the proportions, for example, of about 6 to 10% coal, based on the weight of ore. In the reverberatory furnace, the mixture is heated to about 2300 to 2500° F. and the ferric iron contained in the mixture is reduced to ferrous iron resulting in a slag containing about 10 to 14% tin, probably in the form of silicates, together with iron and calcium silicates. About 50% of the tin present in the ore may be fumed off in this operation and caught in a fume separator, such as a bag house or electric precipitation separator. In the treatment of such an ore by the procedure described above, no metal fraction is formed and the molten slag may be conveyed or flowed to the next treatment in the converter.

Converter

In the converter, which may be a horizontal converter having tuyères as described in the above mentioned Patent 2,261,559, iron pyrites, oil and air may be introduced so as to provide a reducing and sulfidizing atmosphere within the molten mass. In this operation the slag from the primary reverberatory may be tapped (without "freezing") into the converter and the dry pulverized pyrites, in the proportions of about 20% of the slag from the first reverberatory furnace, may be introduced by allowing it to fall into a stream of air and thereby blowing it into the molten slag in the converter, heated to about 2250 to 2500° F., through the said tuyères. The oil and additional air may be introduced through other lines communicating with the tuyères, the proportions of total air to oil being such that the oil will burn beneath the surface of the molten slag and keep it hot, but will be insufficient for complete combustion of the oil and any excess sulfur from the pyrites over and above that required to sulfidize the reduced tin, thus providing a reducing atmosphere and one that tends to reduce the tin oxides of the slag to tin. The added iron pyrites, in addition to its reducing action, liberates sulfur and permits the sulfidization of the tin and its volatilization as a tin sulfide. The amount of air may be in excess of that required to completely burn the oil that enters the tuyères but, because of an excess of pyrites carried by the gases, may still provide a condition that is reducing as well as sulfidizing to the tin. As an example of suitable proportions for producing a reducing and sulfidizing atmosphere within the body of the molten slag, about 275 to 350 cubic feet of free air per minute is introduced into about 5 tons of molten slag, prepared as described above, together with about 12 to 14 gallons per hour of oil (such as any low viscosity, easily atomized, light fuel oil) and about 500 pounds per hour of iron pyrites.

The preferred total amount of pyrites to treat a slag as described above is about 1.6 pounds of pyrites per pound of tin content of the slag and the time of blowing the converter is regulated by the rate at which the pyrites is fed. For example, if a 10,000 pound slag charge containing 14% or 1400 pounds of tin is added to the converter, about 2240 pounds of pyrites should be blown through the slag. If the pyrites is blown at a rate of 500 pounds per hour, the slag will be finished in about 4½ hours. If the pyrites is blown at a rate of 400 pounds per hour, the slag will be finished in about 5½ hours, etc. The temperature control is important in that if the temperature runs substantially under 2250° F., it is difficult to reduce the slag to the desired limit of less than 0.5% tin. Beginning at about 2300° F., however, the temperature is sufficient to permit complete reduction of the tin content of the slag. The upper limit of temperature, i. e., around 2500° F., is set by factors of economy, such as the time available, the effect upon the brick work of the converter, etc.

This treatment converts the tin to tin sulfide, which is vaporized and is immediately burned to tin oxide in the atmosphere above the slag. The tin oxide goes off as a fume and is caught in the fume separator. Lead, zinc, bismuth, arsenic, antimony and silver, if present in the slag, will also go with the tin to the fume separator. Iron remains in the slag, principally as iron silicate, and the resultant slag (containing about ½% or less of tin) may go to waste.

In this operation the sulfur also may be introduced in other forms, for example, in the form of other sulfur compounds or as free sulfur. However, a marked advantage is obtained by the use of iron pyrites for this purpose. Also, if desired, the bags in which the ore was received may be baled and charged to the converter to recover the small amount of tin retained by the bag material.

Fume separation

The fumes from the primary reverberatory and from the converter may be collected together in the fume separator, which may be of any suitable type, for example, a bag house and/or electric precipitator.

Secondary reverberatory

The separated fume is charged into a secondary reverberatory (which may be the same or a different furnace from the primary reverberatory), together with a carbonaceous material and proper fluxes and the necessary amount of water. For example, the fume may be mixed with about 12 to 20% powdered coal (anthracite breeze) and sufficient water to pelletize the mixture. This mixture is then introduced into the secondary reverberatory furnace, together with about 3 to 5% of soda ash, and the mixture is heated to a temperature of about 2000 to 2300° F., the limitation on the low side being the point above which a fluid slag is formed from the mixture of soda ash added to the charge and the ash content of the coal which it fluxes. The upper limit is designated as 2300° F., since above that temperature there is a very heavy refuming of the metal as it is reduced from the fume of the charge. The mixture of the charge with water is advisable, apparently because the water reacts with the coal to form hydrogen and carbon monoxide, and these gases are the actual reducing agents which reduce the $SnO_2$ of the fume to tin. If the charge is dry, it is necessary to raise the temperature so high that the efficiency of reduction becomes very low and a great deal of the tin is simply refumed. Also, it is advisable to carry out this reduction in what is known as a "wet furnace." In other words, the charge should be added over a relatively deep bath in the furnace, and in such small unit quantities that each additional charge will float on this metal bath. The presence of a liquid layer on which the reducing charge floats has the effect of collecting the tin pellets as they reduce out of the charge.

In this furnace most of the tin is reduced to metal, along with most of the copper, iron, gold, silver, arsenic, antimony, lead and bismuth present in the fumes. The zinc present in the fumes is refumed in this reverberatory along with minor proportions of the other metals. This zinc-enriched fume can be caught in a separate bag house whenever the zinc has built up a sufficient proportion to warrant its separation from the other metal oxides by leaching or by other conventional means. The residue from the leaching, or other treatment to remove zinc, or the fume separated if it is not so leached or treated, may be returned to the second reverberatory furnace.

The slag from the secondary reverberatory furnace contains a small amount of tin together with traces of other metals and may be returned to the primary reverberatory or to the converter.

*Refining operations*

The metal fraction from the second reverberatory furnace may be tapped off and further refined by the usual methods, such, for example, as sulfur drossing to remove copper, iron and arsenic, aluminum or sodium drossing to remove antimony, stannous chloride drossing to remove lead and if necessary by electrolytic refining, for example, in a sodium sulfide electrolyte.

In the specific example given above, reference has been made to the treatment of a Bolivian cassiterite containing about 20% tin, but it is not intended to thereby limit the invention to such an ore and obviously variations in details may be necessary or desirable with tin from other sources. For example, as pointed out above, in treating a tin ore or concentrate containing 25% or more of tin together with a sulfur content of 3% or more, it may be desirable to pass the pulverized ore or concentrate through a roaster, for example of the Herreshoff type, to remove the sulfur before the initial smelting step. If this procedure is followed, the dust may be separated from the roaster gases from the roaster and returned to the cooled roasted ore or concentrate to be smelted. The cooled roasted ore or concentrate may be then subjected to the procedure as described above, suitable variations being made for the differences in the material being treated. For example, a larger amount of coal dust may be added in the primary reverberatory to reduce a portion of the tin to metallic tin and the reduced metal fraction may be separated and further treated in the refining operations or may be used to build up the initial liquid metal level in the second reverberatory.

The drawing is a diagrammatic flow sheet illustrating an application of the process, the legends on the drawing indicating the various steps of the operation.

It is obvious that many other variations may be made in the above procedure and it is not intended to limit the invention to the particular sequence of steps, temperature, pressures, proportions, etc. given in the illustrative example.

Also, the various steps described may be used alone and with other preparatory steps or with other subsequent steps. For instance, the tin may be separated from the iron and silicates by the primary reverberatory treatment and the converter treatment as described and the fumes separated thereby may be subjected to other treatment to concentrate and refine the tin therein.

Or the blowing of a combustible substance, such as oil, and a sulfur-containing substance, such as iron pyrites, and an oxygen-containing gas, such as air, in such proportions as to give an incomplete combustion and reduction and sulfidization beneath the surface of the substance to be treated may be applied to other tin-containing substances than the molten slag; for example, it may be applied to the removal of tin from a metal fraction containing reduced tin and iron. Also, the tin-containing substance may be reduced, while avoiding reduction of iron to metal as described herein, and the tin may be volatilized from the slag by other treatments, such, for example, as by blowing chlorine gas, or a chlorine-containing substance, through the molten slag.

Other agents may be used in place of coal dust to obtain the reducing in the primary or secondary reverberatories or the converter. For example, charcoal, coke, such as petroleum coke, or similar solid carbonaceous reducing materials, or gaseous reducing materials may be used in place of coal dust or in place of each other. Also, other fluxing agents may be used in the secondary reverberatory in place of soda ash; for example, calcium fluoride, borax, lime-iron silicate or other low temperature slag forming ingredients that will take up slag forming ash from the coal and which will form a slag that will protect the metal of the bath from the oxidizing effect of the reverberatory flame. The ores or concentrates treated usually contain sufficient iron and silica to form an easy melting slag. If they do not, lime, silica or other slag forming ingredients, such as borax, soda ash, fluorides, etc. may be added. The addition of lime to the ore or concentrate makes it possible to produce a slag containing less tin and thus throw a smaller burden on the converter. Whether or not this would be advisable is a question of economics of operation. Also, iron scrap may be added in this step, if desired, to assist in the subsequent removal of arsenic. The various smelting, converting, fume separating, and other steps may also be carried out in other forms of apparatus and it is not intended to restrict the invention to the particular equipment mentioned in the illustrative example.

Various provisions, of course, may be made for economizing heat. For example, the fumes from one or more of the various heating steps may pass through a heat interchanger, for instance, in a waste heat steam boiler, and the steam may be utilized in subsequent steps, such as to heat the electrolyte in the electrolysis tanks.

The terms used in describing the invention have been used in their descriptive sense and not as terms of limitation and it is intended that all equivalents thereof be included within the scope of the appended claims.

What I claim is:

1. In the separation of tin from tin-containing materials containing iron, the steps comprising smelting the material under reducing conditions throughout the mass in the presence of a slag forming material and without the formation of a substantial quantity of matte, said reduction being sufficient to reduce ferric iron to ferrous iron but insufficient to reduce substantial quantities of ferrous iron to metal, separating from any metal fraction the resultant molten slag containing substantially all of the iron and sufficient tin to prevent reduction of ferrous iron to metal during the aforesaid reduction and sulfidizing the molten slag to volatilize tin contained therein.

2. In the separation of tin from tin-containing materials containing iron, the steps comprising subjecting the material to a carbonaceous reduction throughout the mass in the presence of a slag forming material to reduce ferric iron to ferrous iron without the formation of a substantial quantity of matte, arresting the reduction before a substantial quantity of ferrous iron is reduced to metal, separating from any resulting metal fraction the resulting molten slag containing substantially all of the iron and sufficient tin to prevent reduction of ferrous iron to metal during the aforesaid reduction operation and volatilizing the tin from the molten slag.

3. In the separation of tin from tin-containing materials containing iron and silicates, the steps comprising subjecting the material to a carbonaceous reduction throughout the mass to reduce ferric iron to ferrous iron without the formation of a substantial quantity of matte, arresting the reduction before a substantial quantity of ferrous iron is reduced to metal, separating from any resulting metal fraction the resulting molten slag containing substantially all of the iron and sufficient tin to prevent reduction of ferrous iron to metal during the aforesaid reduction operation and subjecting the molten slag to sulfidization to volatilize tin contained therein.

4. In the separation of tin from tin-containing materials containing iron, the steps comprising smelting the material under reducing conditions throughout the mass in the presence of a slag forming material and without the formation of a substantial quantity of matte, said reduction being sufficient to reduce ferric iron to ferrous iron but insufficient to reduce substantial quantities of ferrous iron to metal, separating the resulting molten slag containing substantially all of the iron and sufficient tin to prevent reduction of ferrous iron to metal during the aforesaid reduction from any metal fraction and blowing sulfur-containing material in a reducing atmosphere through the molten slag to volatilize tin contained therein.

5. In the separation of tin from tin-containing materials containing iron, the steps comprising smelting the material under reducing conditions throughout the mass in the presence of slag forming materials and without the formation of a substantial quantity of matte, said reduction being sufficient to reduce ferric iron to ferrous iron but insufficient to reduce substantial quantities of ferrous iron to metal, separating the resulting molten slag containing substantially all of the iron and sufficient tin to prevent reduction of ferrous iron to metal during the aforesaid reduction from any metal fraction and blowing iron pyrites in a reducing atmosphere through the molten slag to volatilize tin contained therein.

6. In the separation of tin from tin-containing materials containing iron and silicates, the steps comprising smelting the material under reducing conditions throughout the mass and without the formation of a substantial quantity of matte, said reduction being sufficient to reduce ferric iron to ferrous iron but insufficient to reduce substantial quantities of ferrous iron to metal, separating from any metal fraction the resulting molten slag containing substantially all of the iron and sufficient tin to prevent reduction of ferrous iron to metal during the aforesaid reduction and blowing iron pyrites in a reducing flame through the molten slag to volatilize tin contained therein.

7. In the separation of tin from tin-containing materials containing iron, the steps comprising smelting the material under reducing conditions throughout the mass in the presence of a slag forming material and without the formation of a substantial quantity of matte, said reduction being sufficient to reduce ferric iron to ferrous iron but insufficient to reduce substantial quantities of ferrous iron to metal, separating the resulting molten slag containing substantially all of the iron and sufficient tin to prevent reduction of ferrous iron to metal forming the aforesaid reduction from any metal fraction, sulfidizing the slag to volatilize tin contained therein, collecting the fume dust from the sulfidizing step and heating it in a reducing atmosphere to reduce the tin to metal.

8. In the separation of tin from tin-containing substances containing iron, the steps of heating the tin-containing substance in the presence of a carbonaceous reducing agent and a slag forming substance to smelt the mixture under reducing conditions throughout the mass to reduce ferric iron to ferrous iron without substantial reduction of the ferrous iron to metal and without the formation of a substantial quantity of matte, separating any metal fraction and heating the resultant molten slag, containing substantially all of the iron and sufficient tin to prevent reduction of ferrous iron to metal during the aforesaid reduction, in a reducing atmosphere in the presence of a sulfur-containing substance, collecting the fume dust from the sulfidizing step, and heating it in a reducing atmosphere to reduce the tin to metal.

9. In the separation of tin from tin-containing materials containing iron and silicates, the steps comprising smelting the material under reducing conditions throughout the mass and without the formation of a substantial quantity of matte, said reduction being sufficient to reduce ferric iron to ferrous iron but insufficient to reduce substantial quantities of ferrous iron to metal, separating from any metal fraction the resulting molten slag containing substantially all of the iron and sufficient tin to prevent reduction of ferrous iron to metal during the aforesaid reduction, sulfidizing the slag to volatilize tin contained therein, collecting the fume dust from the smelting and sulfidizing steps, heating it in a reducing atmosphere in the presence of fluxing agents and refining the resultant tin-rich metal.

10. In the separation of tin from tin-containing substances containing iron, the steps of heating the tin-containing substance in a reducing atmosphere throughout the mass in the presence of a slag forming substance to smelt the mixture without the formation of a substantial quantity of matte, reduce ferric iron to ferrous iron and fume off a portion of the tin without substantial reduction of ferrous iron to metal, heating the resultant molten slag, containing substantially all the iron and sufficient tin to prevent reduction of ferrous iron to metal during the aforesaid reducing operation, in a reducing atmosphere in the presence of a sulfur-containing substance to fume off more of the tin, collecting the fume from the smelting and sulfidizing operations and heating it in a reducing atmosphere to reduce the tin to metal.

11. In the separation of tin from tin-containing substances containing iron, the steps of heating the tin-containing substance in a reducing atmosphere throughout the mass in the presence of a slag forming substance to smelt the mixture without the formation of a substantial quantity of matte, reduce ferric iron to ferrous iron and fume off a portion of the tin without substantial reduction of ferrous iron to metal, heating the resultant molten slag, containing substantially all the iron and sufficient tin to prevent reduction of ferrous iron to metal during the aforesaid reducing operation, in a reducing atmosphere in the presence of iron pyrites to fume off substantially all of the remainder of the tin, collecting the fume from the smelting and sulfidizing operations and heating it in a reducing atmosphere in the presence of a fluxing agent.

12. In the separation of tin from tin-containing substances containing iron, the steps of heating the tin containing substance in the presence of coal dust to smelt the mixture under reducing conditions throughout the mass to reduce ferric iron to ferrous iron without the formation of a substantial quantity of matte and fume off a portion of the tin without substantial reduction of ferrous iron to metal, separating any metal fraction and heating the resultant molten slag, containing substantially all of the iron and sufficient tin to prevent reduction of ferrous iron to metal during the aforesaid reduction, in a reducing atmosphere in the presence of iron pyrites to fume off substantially all of the remainder of the tin, collecting the fume from the smelting and sulfidizing operations and heating it in the presence of coal and soda ash to reduce the tin to metal.

13. In the separation of tin from tin-containing substances, the steps of blowing through the molten substance a carbonaceous combustible substance, an oxygen containing gas and a sulfur-containing substance in proportions to cause an incomplete combustion and a reducing and sulfidizing atmosphere beneath the surface of the molten material.

14. In the separation of tin from a tin-containing slag, the steps of blowing through the molten slag, a hydrocarbon fuel, an oxygen containing gas, and a sulfur-containing substance, in proportions to cause an incomplete combustion of the hydrocarbon fuel and sulfur-containing substance and provide a reducing and sulfidizing atmosphere beneath the surface of the molten slag.

15. In the separation of tin from tin-containing substances, the steps of blowing through the molten substance, oil, air, and iron pyrites in proportions to cause an incomplete combustion and a reducing and sulfidizing atmosphere beneath the surface of the molten material.

16. In the separation of tin from tin and iron containing substances, the steps of heating the substance in a reducing atmosphere throughout the mass in the presence of a slag forming substance to smelt the mixture without the formation of a substantial quantity of matte, reduce ferric iron to ferrous iron and fume off a portion of the tin, heating the resultant molten slag, containing substantially all of the iron and sufficient tin to prevent reduction of ferrous iron to metal during the aforesaid reduction, in a reducing atmosphere in the presence of a sulfur bearing substance to fume off more of the tin, collecting the fume from the smelting and sulfidizing operations, heating it in a reducing atmosphere to reduce tin to metal, and separating and further refining the metal fraction.

17. In the separation of tin from tin and iron containing substances, the steps of heating the substance in a reducing atmosphere throughout the mass in the presence of a slag forming substance to smelt the mixture without the formation of a substantial quantity of matte, reduce ferric iron to ferrous iron and fume off a portion of the tin, blowing through the molten slag, containing substantially all of the iron and sufficient tin to prevent reduction of ferrous iron to metal during the aforesaid reduction, a carbonaceous combustible substance, an oxygen containing gas, and a sulfur-containing substance, in proportions to cause an incomplete combustion of the carbonaceous and sulfur-containing substances and provide a reducing and sulfidizing atmosphere beneath the surface of the molten slag.

18. In the separation of tin from a tin ore or concentrate containing iron and over about 20% tin and a sulfur bearing material, the steps of roasting the material to remove sulfur, returning the dust to the roasted material, heating the roasted material in a reducing atmosphere throughout the mass to reduce tin to metal and ferric iron to ferrous iron but with insufficient reduction to reduce ferrous iron to metal, separating the metal fraction, heating the resultant molten slag, containing substantially all of the iron and sufficient tin to prevent reduction of ferrous iron to metal during the aforesaid reduction, in a reducing atmosphere in the presence of a sulfur bearing substance to fume off tin, collecting the fumes from the reducing and sulfidizing steps and heating it in a reducing atmosphere to reduce tin to metal.

19. In the separation of tin from a tin ore or concentrate containing iron and not over about 25% tin, the steps comprising heating the material in a reducing atmosphere throughout the mass and without the formation of a substantial quantity of matte, said reduction being sufficient to reduce ferric iron to ferrous iron but insufficient to produce a metal fraction, heating the resultant molten slag, containing substantially all of the iron and sufficient tin to prevent reduction of ferrous iron to metal during the aforesaid reduction, in a reducing atmosphere in the presence of a sulfur bearing substance to fume off tin, collecting the fumes from the reducing and sulfidizing steps and heating it in a reducing atmosphere to reduce tin to metal.

WILLIAM H. OSBORN.

CERTIFICATE OF CORRECTION.

Patent No. 2,304,197.                                December 8, 1942.

WILLIAM H. OSBORN.

It is hereby certified that error appears in the printed specification of the above numbered patent requiring correction as follows: Page 5, first column, lines 42 and 43, claim 4, lines 58 and 59, claim 5, and second column, lines 15 and 16, claim 7, strike out "from any metal fraction" and insert the same before "the resulting" in first column, lines 39 and 55, and second column, line 12, claims 4, 5 and 7 respectively; and page 5, second column, line 15, for "forming" read --during--; and that the said Letters Patent should be read with this correction therein that the same may conform to the record of the case in the Patent Office.

Signed and sealed this 26th day of January, A. D. 1943.

(Seal)

Henry Van Arsdale,
Acting Commissioner of Patents.